United States Patent
Luft et al.

(10) Patent No.: US 9,222,429 B2
(45) Date of Patent: Dec. 29, 2015

(54) ENGINE CONTROL SYSTEM HAVING A CAM PHASER

(71) Applicant: Caterpillar Inc., Peioria, IL (US)

(72) Inventors: Aaron C. Luft, Frankfort, IN (US);
Darryl D. Baldwin, Lafayette, IN (US);
Rohit Menon, Schaumburg, IL (US);
Jordan P. Gilsinger, West Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 127 days.

(21) Appl. No.: 13/767,206

(22) Filed: Feb. 14, 2013

(65) Prior Publication Data

US 2014/0224200 A1    Aug. 14, 2014

(51) Int. Cl.
| | | |
|---|---|---|
| *F01L 1/34* | (2006.01) |
| *F02D 41/14* | (2006.01) |
| *F01L 1/344* | (2006.01) |
| *F02D 13/02* | (2006.01) |
| *F02D 19/06* | (2006.01) |
| *F02D 41/00* | (2006.01) |
| *F02D 41/06* | (2006.01) |
| *F01L 13/00* | (2006.01) |

(52) U.S. Cl.
CPC ........... *F02D 41/1497* (2013.01); *F01L 1/3442* (2013.01); *F02D 13/0219* (2013.01); *F02D 13/0269* (2013.01); *F02D 19/0642* (2013.01); *F02D 41/0002* (2013.01); *F01L 2013/0089* (2013.01); *F01L 2800/01* (2013.01); *F02B 2275/32* (2013.01); *F02D 41/062* (2013.01); *F02D 2041/001* (2013.01); *F02D 2200/101* (2013.01); *Y02T 10/142* (2013.01); *Y02T 10/18* (2013.01); *Y02T 10/42* (2013.01)

(58) Field of Classification Search
CPC . F01L 1/344; F01L 1/3442; F01L 2013/0089; F01L 2800/01; F02D 41/1497; F02D 13/0219; F02D 13/0269; F02D 19/0642; F02D 41/002; F02D 2041/001; F02D 220/101; F02B 2275/32; Y02T 10/18; Y02T 10/142; Y02T 10/42
USPC ................................. 123/90.15, 90.17, 90.31
See application file for complete search history.

(56) References Cited

U.S. PATENT DOCUMENTS

| | | | |
|---|---|---|---|
| 5,724,927 | A | 3/1998 | Suzuki |
| 8,015,957 | B2 * | 9/2011 | Wada et al. ................. 123/90.17 |
| 8,042,516 | B2 | 10/2011 | Takahashi et al. |
| 2002/0177938 | A1 | 11/2002 | Sellnau et al. |
| 2004/0006986 | A1 | 1/2004 | Baeuerle |

(Continued)

FOREIGN PATENT DOCUMENTS

| | | |
|---|---|---|
| EP | 2320038 | 5/2011 |
| WO | 2008068985 | 6/2008 |

*Primary Examiner* — Zelalem Eshete
(74) *Attorney, Agent, or Firm* — Finnegan, Henderson, Farabow, Garrett & Dunner, LLP

(57) ABSTRACT

A control system for a gaseous-fueled engine is disclosed. The gaseous-fueled engine may have an intake valve mechanically driven by a camshaft. The control system may have a variable valve timing device configured to adjust a cyclical opening and closing timing of the intake valve. The control system may further have a sensor configured to generate a signal indicative of a speed of the engine and a controller in communication with the variable valve timing device and the sensor. In addition, the controller may be configured to selectively initiate a first Miller Cycle timing and a second Miller Cycle timing based on the signal.

17 Claims, 4 Drawing Sheets

(56) References Cited

U.S. PATENT DOCUMENTS

| | | |
|---|---|---|
| 2004/0231623 A1 | 11/2004 | El Tahry et al. |
| 2006/0102127 A1 | 5/2006 | Izumit et al. |
| 2007/0221149 A1 | 9/2007 | Ruiz |
| 2009/0222194 A1 | 9/2009 | Bowman et al. |
| 2010/0313845 A1 | 12/2010 | Santoso et al. |
| 2011/0197834 A1 | 8/2011 | Gustafson |
| 2012/0210964 A1 | 8/2012 | Barnes |
| 2012/0227696 A1 | 9/2012 | Gallmeyer |

* cited by examiner

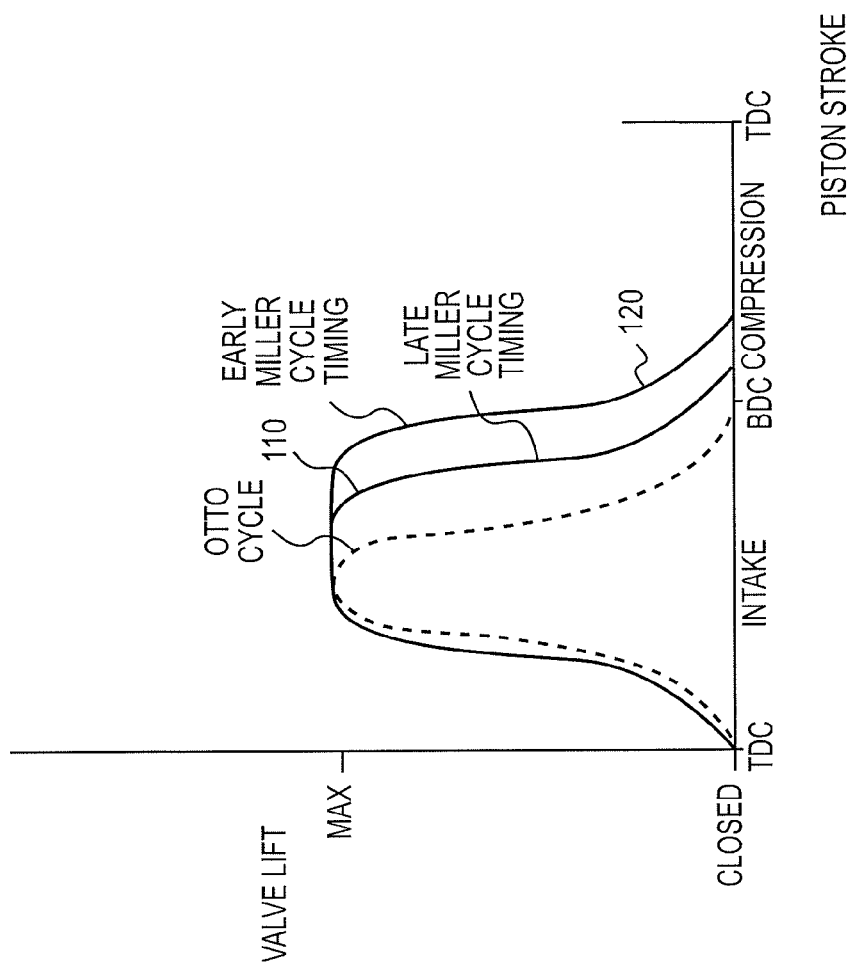

ENGINE CONTROL SYSTEM HAVING A CAM PHASER

TECHNICAL FIELD

The present disclosure is directed to an engine control system and, more particularly, to an engine control system having a cam phaser.

BACKGROUND

Engines produce mechanical output through combustion of a mixture of air and fuel inside cylinders of the engine. Flow of the mixture into the engine cylinders is typically regulated by intake valves that are opened and closed by a cam arrangement, which is operatively connected to a crankshaft of the engine. The rotation of the crankshaft results in a corresponding rotation of a camshaft that drives cyclical movement of one or more cam followers. The cyclical movement of the cam followers results in the actuation of the engine valves. During a typical combustion cycle, the cam arrangement opens each intake valve only during the time period in which the corresponding piston is traveling from top-dead-center (TDC) to bottom-dead-center (BDC). However, in some situations, the timing of the intake valves may be altered, such as during a late inlet closing (LIC) timing, in which the intake valves are left open longer and are not closed until after the piston has started traveling back toward TDC.

Gaseous-fueled engines utilizing a LIC timing instead of conventional timing may produce higher mechanical output and reduced emissions. However, LIC timing may not be ideal for engine startup if the valves close too late. Since the intake valve is open for a longer period of time during LIC timing operation, some of the air and fuel mixture in the cylinder is forced back out through the intake port, reducing the amount of charge (air/fuel mixture) in the cylinder at the time of possible combustion. While this process may have some benefits at higher speeds, the reduced charge may prevent sufficient combustion at startup of the engine.

An exemplary engine is disclosed in US Patent Application Publication 2007/0221149 by Ruiz ('149 publication). In the '149 publication, an internal combustion engine is disclosed that includes a hydraulically controlled cam phaser for adjusting the valve timing of the engine. A hydraulic pump powered by the engine supplies hydraulic fluid to the cam phaser to adjust the position of the cam phaser and thus, the engine timing. The '149 publication further discloses an auxiliary hydraulic pump powered by an electric motor for supplying hydraulic fluid to the cam phaser when the engine is shut down, such that the valve timing may be adjusted (i.e., advanced or retarded) for engine startup.

While the '149 publication discloses an engine with variable valve timing, it does not address startup of a gaseous-fueled engine that normally employs LIC timing. In contrast, the '149 publication discloses using the cam phaser to implement late inlet valve closing at startup. While these modes may improve engine startup efficiency in some applications at higher ambient temperatures, they may actually make starting more difficult for gaseous-fueled engines that normally employ an LIC timing when operating at high speeds. For a gaseous-fueled engine operating at low speeds, for example during engine startup, too much of the fuel/air mixture may be allowed to leave the combustion chamber, which is a problem that would not be addressed by altering the valve timing in the manner disclosed by the '149 publication. Further, since the cam phaser of the '149 publication requires an auxiliary hydraulic system, the engine may be overly complicated and consumer costs may increase.

The present disclosure is directed to overcoming one or more of the problems set forth above and/or other problems of the prior art.

SUMMARY

In one aspect, the present disclosure is directed to a control system for a gaseous-fueled engine. The gaseous-fueled engine may include an intake valve mechanically driven by a camshaft. The control system may include a variable valve timing device configured to adjust a cyclical opening and closing timing of the intake valve. The control system may further include a sensor configured to generate a signal indicative of a speed of the engine and a controller in communication with the variable valve timing device and the sensor. In addition, the controller may be configured to selectively initiate a first Miller Cycle timing and a second Miller Cycle timing based on the signal.

In another aspect, the present disclosure is directed to a method of operating an engine. The method may include directing gaseous fuel into a cylinder of the engine via an intake port regulated by an intake valve and closing the intake valve according to a first Miller Cycle timing. The method may further include activating a variable valve timing device to change the timing of the intake valve once a threshold speed is reached and thereafter closing the intake valve according to a second Miller Cycle timing.

BRIEF DESCRIPTION OF THE DRAWINGS

FIG. 4 is a graph illustrating an exemplary intake valve timing of the engine system of FIG. 1.

DETAILED DESCRIPTION

Figure 1:
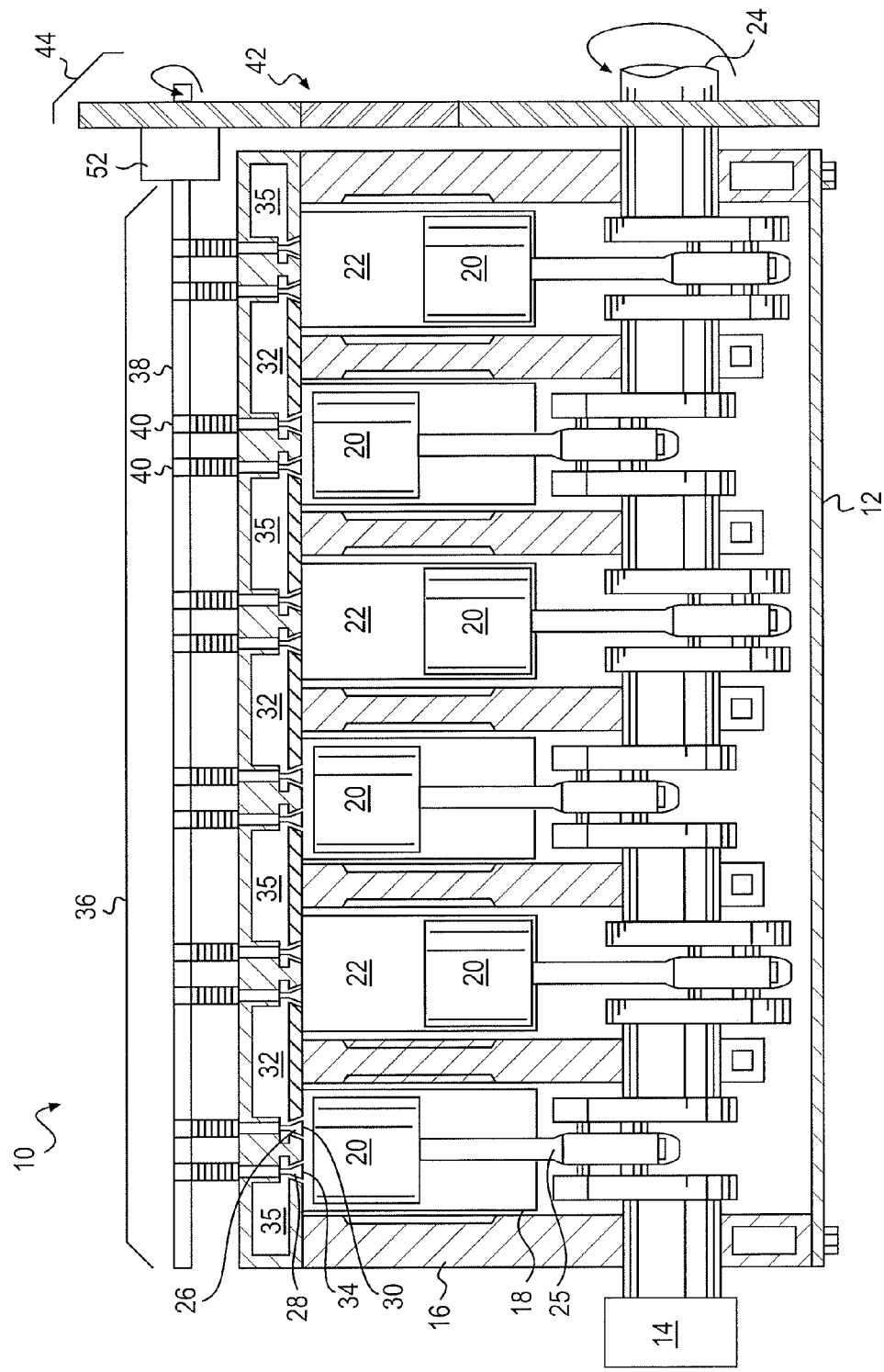
FIG. 1 is a pictorial illustration of an exemplary disclosed engine system.

FIG. 1 illustrates an exemplary engine system 10 consistent with certain disclosed embodiments. For the purposes of this disclosure, engine system 10 is depicted and described as including a spark-ignited, gaseous-fueled, internal combustion engine 12 configured to drive a load 14. However, engine 12 could also embody a dual-fuel engine that runs on a combination of gaseous and liquid fuel (e.g. diesel fuel), if desired. Load 14 may include any type of power consuming system or device that is connected to receive a mechanical power output from engine 12 and utilize the output to perform a specialized task. In one embodiment, load 14 may be a generator located at a mobile or stationary power plant and configured to produce an electrical output (i.e., engine 12 and load 14 may together form a mobile or stationary generator set). In other embodiments, load 14 may be a transmission of a mobile machine, a stationary pump, or another similar device configured to transmit and/or produce a mechanical or hydraulic output.

Engine 12 may include an engine block 16 that at least partially defines one or more cylinders 18, and a piston 20 disposed within each cylinder 18 to form a combustion chamber 22. It is contemplated that engine system 10 may include any number of combustion chambers 22 and that combustion chambers 22 may be disposed in an "in-line" configuration, a "V" configuration, or in any other conventional configuration.

Each piston 20 may be configured to reciprocate between a bottom-dead-center position (BDC—lower-most position within cylinder 18), and a top-dead-center position (TDC—upper-most position within cylinder 18). In particular, piston 20 may be pivotally coupled to a throw of a crankshaft 24 by way of a connecting rod 25. Crankshaft 24 of engine 12 may be journaled within engine block 16 and each piston 20 coupled to crankshaft 24 such that a sliding motion of each piston 20 within each cylinder 18 results in a rotation of crankshaft 24. Similarly, a rotation of crankshaft 24 may result in a reciprocating motion of piston 20. As crankshaft 24 rotates through about 180 degrees, piston 20 may move through one full stroke between BDC and TDC.

Engine 12 may be a four-stroke engine, wherein a complete cycle includes an intake stroke (TDC to BDC), a compression stroke (BDC to TDC), a power stroke (TDC to BDC), and an exhaust stroke (BDC to TDC). It is contemplated, however, that engine 12 may alternatively embody a two-stroke engine, if desired, wherein a complete cycle includes a compression/exhaust stroke (BDC to TDC) and a power/exhaust/intake stroke (TDC to BDC). Accordingly, the reciprocating motion of piston 20 during particular strokes may be defined in terms of angles of crankshaft rotation relative to the TDC and BDC positions. Load 14 may be connected to and driven by one end of crankshaft 24.

Engine 12 may also include a plurality of gas exchange valves associated with each cylinder 18 that are configured to meter air and fuel into and exhaust out of combustion chambers 22. Specifically, engine 12 may include at least one intake valve 26 and at least one exhaust valve 28 associated with each cylinder 18. Intake valve 26 may be configured to normally allow air or an air and fuel mixture to flow through a respective intake port 30 from an intake manifold 32 and into a corresponding combustion chamber 22 during a portion of the intake and/or compression strokes of piston 20. Exhaust valve 28 may be configured to normally allow exhaust to exit from the corresponding combustion chamber 22 through a respective exhaust port 34 and flow into an exhaust manifold 35.

During engine operation, each intake valve 26 may be actuated in any conventional way to move or "lift" and thereby open the respective intake port 30 in a cyclical manner. In the exemplary disclosed engine 12, intake valves 26 may be normally lifted by way of an engine cam assembly 36. Cam assembly 36 may include a camshaft 38 that is rotatingly driven by crankshaft 24 and a plurality of cam lobes 40. During normal operation of engine 12, intake and exhaust valves 26, 28 may be lifted in a predefined cycle by cam assembly 36 through the motion of the associated piston 20 and rotation of crankshaft 24.

Camshaft 38 may operatively engage crankshaft 24 in any manner readily apparent to one skilled in the art where a rotation of crankshaft 24 results in a corresponding rotation of camshaft 38. For example, camshaft 38 may connect to crankshaft 24 through a gear train 42 that increases the rotational speed of camshaft 38 to approximately one half of the rotational speed of crankshaft 24. Alternatively, camshaft 38 may connect to crankshaft 24 through a chain, a belt, or in any other appropriate manner. Cam lobes 40 may be connected along the length of camshaft 38 to cyclically open and close intake valves 26 as they rotate on camshaft 38. The shape of cam lobes 40 may determine, at least in part, the actuation timing and lift of intake valve 26 during an operation of engine 12.

In the exemplary disclosed engine 12, cam assembly 36 may be arranged to lift intake valves 26 according to a LIC timing cycle, such as a late-closing Miller Cycle. For the purposes of this disclosure, the late-closing Miller Cycle may be defined as an engine cycle during which intake valve 26 is held open significantly longer than normally associated with the conventional Otto Cycle (shown in the dashed curve associated with the intake stroke of FIG. 4). For example, during a late-closing Miller Cycle, intake valve 26 may be held open until sometime between approximately 15-95° (with other ranges possible) after BDC of the compression stroke, as compared to only about 10° before or after BDC for conventional timing (e.g. Otto Cycle timing shown in FIG. 4). As piston 20 moves upwards during the compression stroke of the late-closing Miller Cycle, about 10-50% of the air or air and fuel mixture drawn into combustion chamber 22 during the previous intake stroke (i.e., air that would normally be retained within combustion chamber 22 during operation in the conventional Otto Cycle) may be expelled back out the still-open intake valve 26 into intake manifold 32. Accordingly, the conditions inside engine 12 may change to increase the pressure in intake manifold 32, which, when combined with a turbocharger (not shown), may lead to an increased air (or mixture of air and fuel) flow rate and, ultimately, higher mechanical output.

While the late-closing Miller Cycle configuration of cam assembly 36 may increase engine efficiency at higher speeds, starting of engine 12 could be unreliable if left unchecked. That is, the charge in combustion chamber 22 may be too small to overcome load 14 at low speeds. Closing intake valves 26 earlier in the cycle during startup, however, may result in smoother and more reliable starting of engine 12. Therefore, intake valves 26 may be controlled to close earlier during startup. This early closing may only be implemented during engine startup, such that advantages of the LIC timing may be realized during normal operation at higher speeds.

Cam assembly 36 may further include a variable valve timing device 44 that may be selectively used to advance or retard valve timing in relation to crankshaft 24. In this way, variable valve timing device 44 may allow for valve timing optimization to achieve both reliable startup and increased high-speed efficiency of engine 12. In the exemplary disclosed engine system 10, variable valve timing device 44 may be a hydraulically-actuated cam phaser 52 operably connected between camshaft 38 and crankshaft 24. It is contemplated, however, that variable valve timing device 44 could be a different device capable of changing the timing of cam assembly 36, if desired.

Figure 2:
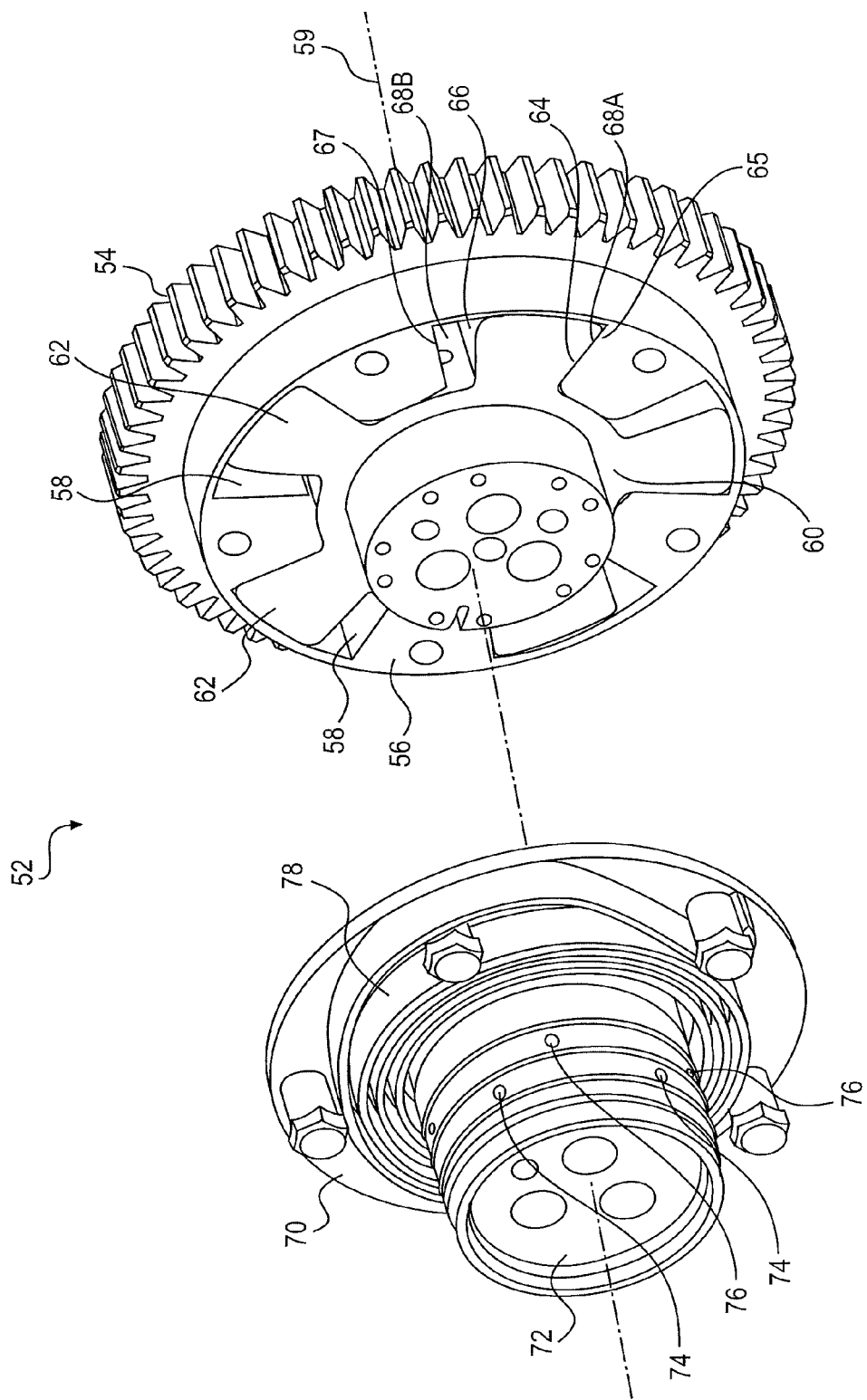
FIG. 2 depicts an exemplary disclosed cam phaser that may be used with the engine system of FIG. 1.

FIG. 2 depicts some of the components of an exemplary disclosed cam phaser 52. Cam phaser 52 may include a gear 54 operatively connected for rotation by crankshaft 24. Gear 54 may house a stator ring 56 that is fixedly connected to gear 54 (e.g. by bolts). Stator ring 56 may include a plurality of cavities 58 annularly arranged around a center axis 59. A rotor 60 may be set inside of stator ring 56 and operatively connected to camshaft 38. Rotor 60 may be configured to shift somewhat in angle about axis 59 relative to gear 54 and stator ring 56. Rotor 60 may include a plurality of lobes 62 corresponding to the plurality of cavities 58 formed by stator ring 56. Lobes 62 may be sized to fit inside of cavities 58, such that space remains between opposing sides 64, 66 of lobes 62 and walls 65, 67 of each cavity 60. The space between sides 64 and walls 65 may form phaser advance cavities 68A and the space between sides 66 and walls 67 may form phaser retard cavities 68B. Phaser advance cavities 68A and phaser retard cavities 68B may be selectively filled with a pressurized hydraulic fluid (e.g. engine oil) to rotate rotor 60 within stator ring 56 in a desired direction.

Rotor 60 may be configured to move between an initial position in which a first side 64 of each lobe 62 rests against its corresponding adjacent wall 66 and a rated position in which the opposite side 65 of each lobe 62 rests against the corresponding adjacent wall 67. Therefore, movement of rotor 60 within stator ring 56 translates to relative angular rotation between camshaft 38 and crankshaft 24. In one embodiment, movement of rotor 60 may result in as much as 10° of relative rotation. In this way, cam phaser 52 may adjust the valve timing of engine 12 by movement of rotor 60. For example, the initial position of rotor 60 may correspond to an early Miller Cycle timing for camshaft 38 and the rated position may correspond to a late Miller Cycle timing for camshaft 38. Rotor 60 may be urged toward the initial position by a torsion spring 78 held on a spring retainer 79.

Cam phaser 52 may additionally include a cover 70 to hydraulically seal the fluid within cavities 58 (except for a drainage slot located around an edge of stator ring 56). A hub 72 may include phaser advance passages 74 and phaser retard passages 76 to allow the hydraulic fluid to pass into phaser advance cavities 68A and phaser retard cavities 68B, respectively. Phaser advance passages 74 may be configured to introduce hydraulic fluid into phaser advance cavities 68A to advance rotor 60 from the initial position to the rated position. Phaser retard passages 76 may be configured to introduce hydraulic fluid into phaser retard cavities 68B to retard movement of rotor 60 towards the rated position and to force rotor back toward the initial position.

Figure 3:
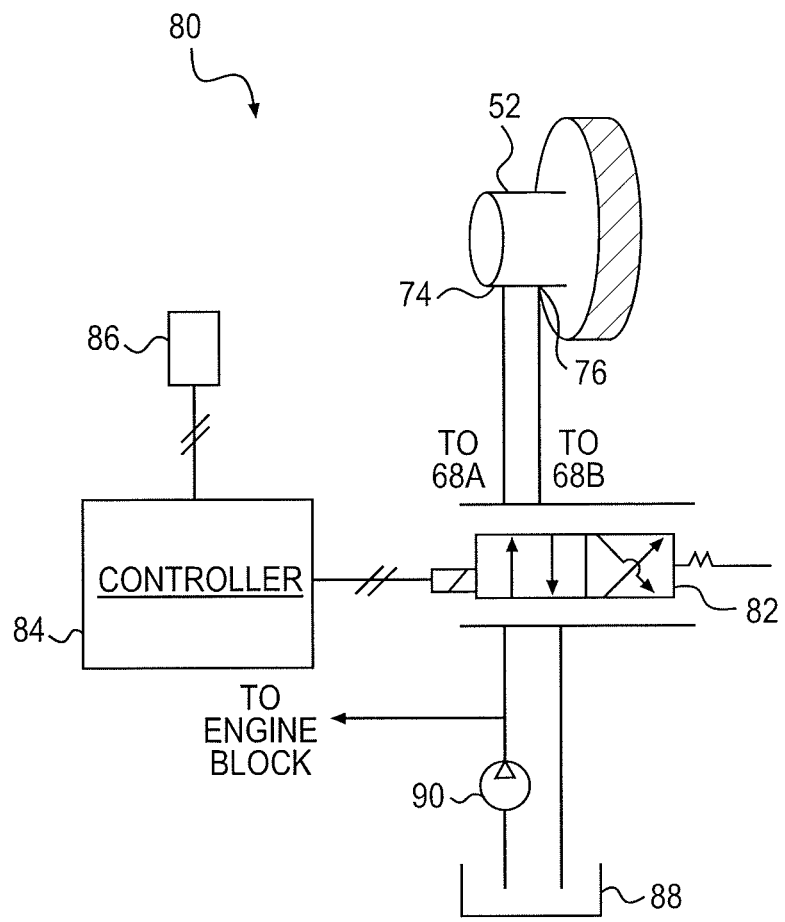
FIG. 3 depicts an exemplary disclosed engine control system that may be used with the engine system of FIG. 1.

FIG. 3 schematically depicts an exemplary control system 80 for controlling cam phaser 52. Control system 80 may include a valve 82 (e.g. a solenoid valve) configured to regulate the flow of hydraulic fluid into and out of cam phaser 52. Valve 82 may be electronically connected to a controller 84 that is configured to manage cam phaser 52. A sensor 86 may be arranged to monitor an engine speed (e.g. a rotational speed of camshaft 38) or any other suitable performance parameter of engine 12, and relay the information to controller 84. A hydraulic fluid reservoir 88 (e.g. an oil pan) may act as a source of hydraulic fluid to be directed through valve 82 to cam phaser 52 by a pump 90. Controller 84 may be configured to selectively activate or deactivate valve 82 based on signals from sensor 86, such that the closing timing of intake valves 26 may be selectively advanced or retarded depending on the speed of engine 12.

FIG. 4 depicts an exemplary process implemented by controller 84. FIG. 4 will be discussed in more detail below to further illustrate the disclosed concepts.

INDUSTRIAL APPLICABILITY

The disclosed engine control system may have application in any gaseous-fueled or dual-fueled engine normally employing a LIC timing, such as the late-closing Miller Cycle timing described herein. The disclosed cam phaser 52 may help to increase efficiency by allowing engine 12 to operate in a high-output late Miller Cycle timing during normal operating conditions (e.g. during speeds at rated power) and in an early Miller Cycle timing during startup. Operation of engine 12 and engine control system 80 will now be explained, with respect to FIG. 4.

In use, cam phaser 52 may allow an operator to smoothly and reliably start engine 12. Before startup, engine 12 may be turned off. Rotor 60 of cam phaser 52 may be locked in the initial position by a lock pin (not shown). When an operator turns an ignition to start engine 12, air and fuel begins to flow into cylinders 18, pistons 20 begin to move, and crankshaft 24 begins to rotate. The rotation of crankshaft 24 causes camshaft 38 to rotate, thereby opening and closing intake valves 26. With cam phaser 52 locked in the initial position, intake valves 26 may open and close according to startup timing 110 (shown in FIG. 4). Startup timing 110 may correspond to an early Miller Cycle timing that allows enough air and fuel mixture to enter and remain in each combustion chamber 22 for smooth and reliable startup. It is contemplated that the early Miller Cycle timing may correspond to intake valves 26 closing approximately 60-80° after BDC, with a particular early Miller Cycle timing for the exemplary disclosed engine 12 being approximately 72° after BDC.

After engine 12 has started, hydraulic fluid from reservoir 88 may be pressurized to allow pump 90 to direct the hydraulic fluid throughout the engine, including to valve 82. When controller 84 determines that the hydraulic fluid pressure has reached a threshold value (e.g. about 100 kPa), valve 82 may be opened only enough to allow hydraulic fluid to enter cam phaser 52 and unlock rotor 60. However, hydraulic fluid may also be directed into phaser retard cavities 68B to maintain rotor 60 in the initial position.

Operation may continue with an increasing speed of engine 12 to produce higher power. As speed increases, the early Miller Cycle timing may produce sufficient power to meet the operator's requirements for a range of lower speeds. However, once the speed of engine 12 reaches a threshold level, it may be necessary to advance rotor 60 of cam phaser 52 and adjust the valve timing for higher efficiencies. It is contemplated that the threshold speed may be approximately 60-75% of rated speed for a given engine 12. For example, for an engine 12 with a rated speed of approximately 1,400 RPM, cam phaser 52 may be signaled to adjust the valve timing once engine 12 has reached approximately 1,050 RPM. After controller 84 determines, via sensor 86, that the threshold speed has been reached, controller 84 may send a signal to open valve 82 further, to direct enough hydraulic fluid through phaser advance passages 74 and into phaser advance cavities 68A to move rotor 60 away from the initial position, against the forces of spring 78 and the hydraulic fluid previously sent to phaser retard cavities 68B. From there, controller 84 may control valve 82 to strategically introduce hydraulic fluid into both phaser advance cavities 68A and phaser retard cavities 68B to regulate the position of cam phaser 52 and corresponding timing of intake valves 26.

When engine 12 reaches rated speed, controller 84 may signal valve 82 to place cam phaser 52 in the rated position, thereby opening and closing intake valves 26 according to high speed timing 120 (shown in FIG. 4). High speed timing 120 may correspond to a late Miller Cycle timing, in which intake valves 26 close at the latest time allowable by cam phaser 52 (i.e. rotor 60 cannot advance any further). The late Miller Cycle timing may produce a desired engine efficiency for a given engine 12 at rated speed, which may be higher than the efficiency normally achieved with a conventional timing. It is contemplated that the late Miller Cycle timing may correspond to intake valves 26 closing at approximately 80-100° after BDC, with a particular late Miller timing for the exemplary disclosed engine 12 being approximately 92° after BDC.

During operation, engine 12 may decrease in speed as load 14 varies. Controller 84 may be arranged to continuously adjust the valve timing via cam phaser 52 under these conditions. That is, as the speed of engine 12 decreases, controller 84 may adjust the position of cam phaser 52 to close intake valves 26 earlier in the cycle, to maintain increased engine efficiency as speed decreases.

After operation of engine 12 is finished, an operator may send a signal to shut down engine 12. During a normal shutdown, engine 12 may coast down from its operating speed to 0 RPM. As engine 12 reduces its speed, there will usually be sufficient hydraulic fluid pressure remaining in the hydraulic fluid passages for controller 84 to direct hydraulic fluid through phaser retard passages 76 and into phaser retard cavities 68B to move rotor 60 until it is locked back in the initial position. In this way, cam phaser 52 may be set to the early Miller Cycle timing for subsequent startup of engine 12. However, if shutdown of engine 12 occurs unexpectedly (e.g. through an emergency stop system or an engine stall), the hydraulic fluid may rapidly lose pressure and be incapable of returning cam phaser 52 to the initial position. In this case, spring 78 may act to urge rotor 60 towards the initial position while gear 54 is rotating, until rotor 60 reaches the initial position for startup timing 110.

Engine control system 80 may allow gaseous-fueled engine 12 to operate with two different Miller Cycle timings, depending on a current engine state. An aggressive (or late) Miller Cycle timing may allow gaseous-fueled engine 12 to produce higher mechanical power than a similarly-sized engine utilizing a conventional valve timing. However, realizing the benefits of such a valve timing may be difficult, due to the problems associated with starting engine 12. Variable valve timing device 44 may allow engine 12 to benefit from the Miller Cycle effect on gaseous-fueled engines while overcoming the possible disadvantages. In this way, a gaseous-fueled engine employing a mechanically-operated valve timing may be capable of operating at an early Miller Cycle timing that accommodates smooth startup and at a late Miller Cycle timing that produces high output and low emissions, which otherwise may not be practical.

It will be apparent to those skilled in the art that various modifications and variations can be made to the engine of the present disclosure without departing from the scope of the disclosure. Other embodiments will be apparent to those skilled in the art from consideration of the specification and practice of the embodiments disclosed herein. It is intended that the specification and examples be considered as exemplary only, with a true scope of the disclosure being indicated by the following claims.

What is claimed is:

1. A control system for a gaseous-fueled engine including an intake valve mechanically driven by a camshaft, the control system comprising:
    a cam phaser located between the camshaft and a crankshaft and configured to adjust a cyclical opening and closing timing of the intake valve, the camshaft including a cam lobe shaped such that the cyclical opening and closing of the intake valve corresponds to a Miller Cycle timing;
    a sensor configured to generate a signal indicative of a speed of the engine; and
    a controller in communication with the variable valve timing device and the sensor,
    wherein the controller is configured to selectively initiate a first Miller Cycle timing and a second Miller Cycle timing based on the signal,
    wherein the cam phaser is spring-biased to an initial position associated with the first Miller Cycle timing after the gaseous-fueled engine is shut down,
    wherein the camshaft is configured to cause the cyclical opening and closing of the intake valve through rotation of the cam lobe, and
    wherein the intake valve is the only intake valve associated with one cylinder of a plurality of cylinders of the engine.

2. The control system of claim 1, wherein:
    the first Miller Cycle timing is initiated during startup of the engine; and
    the intake valve closes earlier in the cycle in the first Miller Cycle timing than in the second miller Cycle timing.

3. The control system of claim 2, wherein the second Miller Cycle timing is utilized after the sensor detects that the gaseous-fueled engine has reached a threshold speed.

4. The control system of claim 3, wherein the threshold speed is approximately 60-75% of a rated speed.

5. The control system of claim 2, wherein the first Miller Cycle timing corresponds to the intake valve closing at approximately 60-80° after BDC.

6. The control system of claim 5, wherein the second Miller Cycle timing corresponds to the intake valve closing at approximately 80-100° after BDC.

7. The control system of claim 1, wherein the cam phaser is controlled by hydraulic fluid.

8. The control system of claim 7, wherein the cam phaser is regulated by a valve that is electronically connected to the controller.

9. A method of operating an engine, comprising:
    directing gaseous fuel into a cylinder of the engine via an intake port regulated by an intake valve;
    closing the intake valve according to a first Miller Cycle timing;
    activating a variable valve timing device including a cam phaser to change the timing of the intake valve once a threshold speed is reached;
    thereafter closing the intake valve according to a second Miller Cycle timing, and
    returning the cam phaser to an initial position associated with the first Miller Cycle timing at shutdown of the engine with the force of a torsion spring,
    wherein the intake valve is the only intake valve associated with the cylinder.

10. The method of claim 9, wherein the intake valve closes earlier in the first Miller Cycle timing than in the second Miller Cycle timing.

11. The method of claim 10, wherein the threshold speed is approximately 60-75% of a rated speed.

12. The method of claim 10, wherein the first Miller Cycle timing corresponds to the intake valve closing at approximately 60-80° after BDC.

13. The method of claim 12, wherein the second Miller Cycle timing corresponds to the intake valve closing at approximately 80-100° after BDC.

14. The method of claim 10, wherein activating the variable valve timing device includes adjusting the position of the cam phaser.

15. The method of claim 14, wherein activating the variable valve timing device includes directing hydraulic fluid into the cam phaser.

16. The method of claim 15, further including selectively regulating the flow of hydraulic fluid into the cam phaser based on a speed of the engine.

17. An engine, comprising:
    an engine block defining at least one cylinder;
    at least one piston;
    an intake valve configured to regulate a flow of gaseous fuel into the at least one cylinder;

a camshaft configured to mechanically drive the intake valve;
a crankshaft driven by the at least one piston; and
a cam phaser connecting the crankshaft to the camshaft and configured to adjust a cyclical opening and closing timing of the intake valve;
a sensor configured to generate a signal indicative of a speed of the crankshaft; and
a controller in communication with the cam phaser and the sensor,
wherein the controller is configured to initiate an early Miller Cycle timing during startup of the engine and a late Miller Cycle timing at a selected rated speed of the engine based on the signal from the sensor,
wherein the cam phaser is spring-biased to an initial position associated with the first Miller Cycle timing after the gaseous-fueled engine is shut down, and
wherein:
  the camshaft includes a cam lobe,
  the camshaft is configured to cause the cyclical opening and closing of the intake valve through rotation of the cam lobe,
  the cam lobe is shaped such that the cyclical opening and closing of the intake valve corresponds to a Miller Cycle timing, and
  the intake valve is the only intake valve associated with one cylinder of a plurality of cylinders of the engine.

* * * * *